No. 714,664. Patented Dec. 2, 1902.
J. E. BRIGGS.
EYEGLASSES OR SPECTACLES.
(Application filed Mar. 5, 1901.)

(No Model.)

Witnesses
O. G. Meagher
C. M. Perkins.

Inventor:
James E. Briggs

UNITED STATES PATENT OFFICE.

JAMES E. BRIGGS, OF ROCHESTER, NEW YORK, ASSIGNOR TO BRIGGS OPTICAL COMPANY, A CORPORATION OF NEW YORK.

EYEGLASSES OR SPECTACLES.

SPECIFICATION forming part of Letters Patent No. 714,664, dated December 2, 1902.

Application filed March 5, 1901. Serial No. 49,799. (No model.)

*To all whom it may concern:*

Be it known that I, JAMES E. BRIGGS, a citizen of the United States, and a resident of Rochester, in the county of Monroe and State of New York, have invented certain new and useful Improvements in Eyeglasses and Spectacles, of which the following is a specification.

This invention relates to eyeglasses and spectacles; and it consists in the devices and arrangements of parts hereinafter described and claimed.

Figure 1:
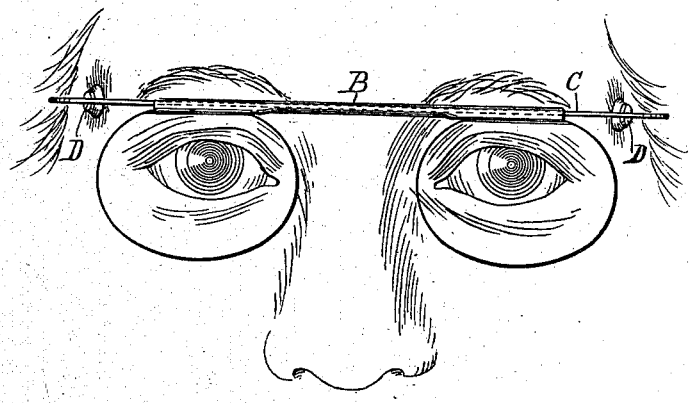
Figure 2:
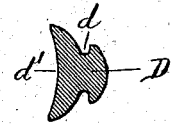
Figure 3:
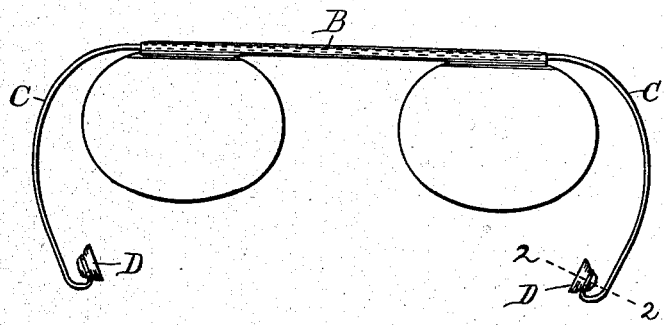

In the drawings, Figure 1 is an elevation of a pair of glasses embodying my invention and showing the manner of their application to the wearer. Fig. 2 is a cross-section of one of the end blocks of my device on the line 2 2 of Fig. 3, and Fig. 3 is an elevation of a pair of glasses folded to lie flat.

The lenses A A are without rims, but have a portion of one edge of each firmly inserted into a slot of a tube B. Through the tube B passes the bow, consisting of an elastic rod or wire C, that is bent around at the ends so as to be adapted to clasp the temples or sides of the head of the wearer or even to be extended over the ears. When the bow or rod C is to hold the eyeglasses by pressure on the temples, I form the ends of said bows into loops and within each loop fasten a block D. This block, as shown in Fig. 2, has a peripheral groove $d$, adapted to contain a loop $c$ at the end of the wire or rod C, and a widened concave face $d'$. The blocks D, of suitable material, are capable of rotation in the loops $c$, that rest in the grooves $d$, and may also be loose in said loops, so as to be capable of rocking therein and yet be held thereby. The loose or rocking action of the blocks D in the loops permits an exact conformity of the face of the block to the surface where it is applied. The ends of the elastic bow C, having been separated, may be released in order to grasp the temples of the wearer, as shown in Fig. 1, by the spring action of the bow, and the blocks will conform to the surface of said temples by their rocking action. In addition, the concavity of the faces $d'$ forms a projecting peripheral edge that produces security of the grasp upon the temples. When the blocks are set against the temples, they are pressed against them by the spring-bow. The heat of the skin then expands the air in the concavities of the blocks and drives more or less of the air out, whereby the blocks become attached to the temples automatically and with greater security than if held by the pressure of the spring-bow alone. The lenses A A are adapted to rest upon the cheeks of the wearer and to support the tube B in such position that it does not rest upon the nose or forehead. The bow C passes through and fits the tube B with some friction; but said tube may be revolved upon said bow, so that the plane of the lenses A A may be changed with reference to the line of sight and while in use. The lenses A A and the tube B may be revolved upon the rod or wire C, so as to rest above the eyes, thus removing the lenses from the lines of sight. So, too, the lenses, with the bow, may be turned upon the blocks and may be raised from in front of the eyes without turning the blocks, and thereby twisting the skin where the blocks press against it.

By the foregoing construction the bow-wire C is continuous from the point of pressure on one temple to the point of pressure on the other, which when the blocks D are used for the electrical purpose hereinafter mentioned constitutes a continuous and uninterrupted circuit-wire for the electrical current and in addition is without joints, soldered or otherwise.

I prefer to make the blocks D in a single pair of glasses of different materials of opposite polarities—such as copper and zinc—upon one or both of which the fluids of or on the skin can act and produce an electrical current. Inasmuch as the rimless lenses A A rest upon the cheeks of the wearer, the tube B and the continuous wire C are insulated from the face of the wearer, except at the points where the blocks D press against the skin. Consequently an electrical current is created which passes through the head of the wearer from one block D to the other. These blocks may be of various sizes. The larger the bearing-surface of the blocks against the skin of the wearer the greater will be the electrical current produced. The concavity $d'$ of said blocks retains and increases the exudation of the fluids of the skin, and thus increases this electrical current.

What I claim is—

1. In eyeglasses, the combination of a continuous spring-bow wire, revoluble blocks on the ends of said wire and adapted to be pressed against the sides of the head of the wearer by said ends, and lenses journaled on said wire, substantially as described.

2. In eyeglasses, the combination of a continuous spring-bow wire, revoluble solid blocks having concave faces on the ends of said wire and adapted to be pressed against the sides of the head of the wearer by said wire, and lenses journaled on said wire, substantially as described.

3. In eyeglasses, a continuous spring-bow wire, solid blocks of material of different polarities on the ends of said bow, one or both of said blocks being adapted to be acted upon by the fluids of the skin to produce an electrical current, said blocks having concave faces, and adapted to be pressed against the sides of the head of the wearer by said wire, and lenses carried by said spring, substantially as described.

4. In eyeglasses, the combination of a spring-bow device adapted to clamp the head of the wearer between its ends, non-compressible blocks on the ends of said bow having concave faces, and lenses carried by said bow device, substantially as described.

JAMES E. BRIGGS.

Witnesses:
ANNA G. MEAGHER,
C. M. PERKINS.